Patented Dec. 1, 1931

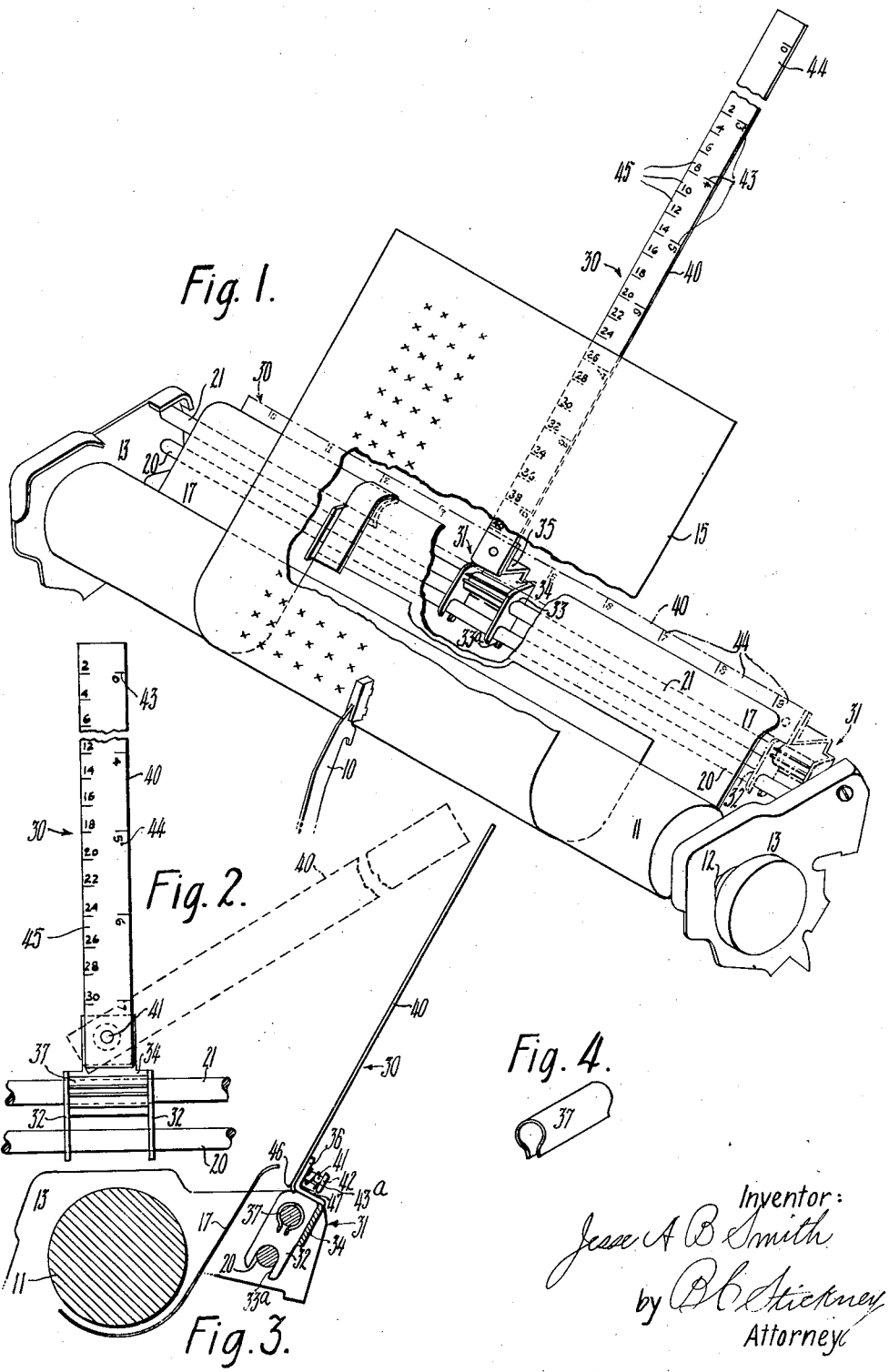

1,834,504

UNITED STATES PATENT OFFICE

JESSE A. B. SMITH, OF STAMFORD, CONNECTICUT, ASSIGNOR TO UNDERWOOD ELLIOTT FISHER COMPANY, OF NEW YORK, N. Y., A CORPORATION OF DELAWARE

TYPEWRITING MACHINE

Application filed September 5, 1930. Serial No. 479,858.

This invention relates to means for determining the margins of typed sheets in typewriting machines, and is especially adapted for portable machines.

An object of the invention is to provide means for aiding the operator to properly locate the sheet laterally when inserting the same into the machine, and more particularly to center the sheet in the machine, if so desired.

Another object is to provide convenient means for enabling the operator to determine when the page is sufficiently full of typing, so as to eliminate the liability of crowding extra lines on the bottom margin on the page.

In portable typewriting machines there are required lightness and compactness, and low manufacturing cost, and, in order to meet these requirements, the invention provides a single scale-bar to be used both for locating the work-sheet laterally and also for determining the margin at the bottom of the sheet. This scale-bar is mounted upon the platen-carriage in rear of the platen, where it is readily visible, and it is properly graduated and numbered so that the operator can readily locate his sheet laterally at any desired point, or to have any desired side margin, the graduations upon said rear scale registering with the usual front platen-scale. If desired, the numbering of the graduations upon the novel scale may be in two directions from the middle, for convenience in centering a work-sheet in the machine.

When the work-sheet is nearly full of typing, the operator may swing said scale up behind the sheet, and thereby bring into use a second set of graduations provided upon the scale, and numberered vertically. The leading edge of the work-sheet rests upon the scale so erected, and, by consulting the graduations upon the scale, the operator is enabled to determine for how many lines there is still room at the bottom of the sheet. This scale is mounted upon a slide which can be slidden towards the middle of the carriage when it is to be used for page-end-gaging purposes; said slide being returnable to its normal position at one end of the carriage, preparatory to inserting the next work-sheet.

When the free end of the scale is swung down, it may be held in place by a yielding detent or snap, without unduly interfering with the next scale-lifting operation.

Other features and advantages will hereinafter appear.

In the accompanying drawings,

Figure 1 is a perspective of the improvement in two positions upon the platen-carriage of an Underwood portable, parts being broken away.

Figure 2 is a front elevation of the improvement.

Figure 3 is a sectional side elevation.

Figure 4 is a friction collar.

My invention is illustrated as applied to an Underwood portable typewriting machine, in which types 10 strike against a platen 11 on a shaft 12 journaled in carriage-end plates 13. For guiding a work-sheet 15, a rear paper-table 17 is fastened between the end plates 13.

A stiffening tie-rod 20 connects the end plates 13 in the rear of the platen. A shaft 21 extends between the end plates 13 a short distance above the tie-rod 20 and serves as a fulcrum for the usual feed-roll-release lever (not shown). The above-described parts may be of the same construction as like parts in an Underwood portable typewriting machine.

It is a feature of this invention to mount a novel scale-device, generally designated as 30, on the platen-carriage for lateral adjustment.

In carrying out this feature, a slide, generally designated as 31, is formed from sheet-metal with side frame-members 32, each of which has an open slot 33ª in its lower end portion loosely sliding upon the tie-rod 20. Each frame-member 32 also has aligned apertures 33 having a sliding fit upon cross-rod or shaft 21. The upper rear edge portions of the side members 32 are integrally joined by a cross-piece 34, which has an upper extension 35 bent forwardly a short distance and then upwardly at 36, behind the upper edge of the paper-table 17.

The novel scale-member 30 may be set to a plurality of operating positions upon slide 31, and the slide is provided with means to hold it against lateral displacement, wherever it may be set along the rods 20, 21, while permitting the slide to be readily slidden to another operating position. To this end, a friction collar in the form of a spring clip 37, resembling a split tube, Figure 4, may be disposed around the shaft 21 between the side members 32, between which the collar fits snugly. The collar or clip 37 has sufficient tension to grip the shaft 21 so tightly that lateral movement of the platen-carriage 14 will not cause lateral displacement of the slide 31. The friction of the clip 37 on the shaft can be readily overcome, however, by sidewise pressure of the operator's hand on the slide, and the latter can easily be shifted to any desired position along the shaft 21.

The novel device includes a scale-plate 40, which may be a thin straight strip of steel. It is pivoted to the projection 36 of the crosspiece 34, by means of a pin 41, which extends through part 36 and is riveted to 40. The rear end of the pin has a head 42, and a coil spring washer 43ª is compressed between the head 42 and the part 36.

Normally the scale 44 is in a cumbent position, as shown by dotted lines, Figure 1. The slide 31 is shown at the right-hand end of the carriage. The scale shows just above the top of paper-shelf 17. The work-sheet may be adjusted laterally by means of the numbered graduations 43 formed along the top edge of the scale. After the page is partly typed, the scale-staff 44 may be swung up, and both slide and scale may be slidden as a unit to the left, bringing into use a page-end indicating scale 45 along the opposite edge from 43.

In some cases the scale markings 43 may be omitted, and the device used simply as a fold-down page-end staff, the sliding of the base or slide 31 to either right or left permitting the staff to be swung down compactly to horizontal position preparatory to covering and carrying the portable typewriter.

The staff 40 has its lower end formed with a lip 46 fitting tightly around the bend 47 in the projection 36.

Variations may be resorted to within the scope of the invention, and portions of the improvements may be used without others.

Having thus described my invention, I claim:

1. The combination with a typewriting machine, of a scale-bearing staff, and means for disposing said staff in two different operative positions, said staff having a separate scale corresponding to each operative position, in one operative position said staff being effective for locating work-sheets laterally on said machine, and in the other operative position said staff being effective for determining the number of lines that remain to be typed at the bottom of the sheet.

2. In a typewriting machine, the combination with a platen and a platen-carriage, of a scale-bar slidable along said carriage, and means for disposing said scale-bar in a page-centering work position parallel to the platen and in a page-end-determining work position transversely to said first-named position, said scale-bar having a letter-space scale for use in the first position and a line-space scale for use in the second position.

3. In a typewriting machine, the combination with a carriage, of a displaceably mounted scale on said carriage having two different sets of graduations, said scale movable to positions wherein each of said graduations becomes effective for manipulating a work-sheet in said typewriting machine.

4. In a typewriting machine, the combination with a platen-carriage, a rear paper-table on said carriage, and a side-edge guide on said paper-table for inserting a work-sheet around the platen of said machine, of a displaceably mounted gage on said carriage, said gage having graduations effective in one work position for setting said guide to center said work-sheet in said machine, said gage having graduations effective in another work position to determine how many additional lines may be typed on said work-sheet.

5. In a typewriting machine, the combination with a laterally disposed revoluble platen, of a scale-bar, and means for disposing said scale-bar parallel to said platen, said scale-bar having a scale suitable for laterally locating a work-sheet for insertion around said platen in a desired position, said means also effective for disposing said scale-bar in a plane at right angles to said platen for engagement with the leading edge of the typed work-sheet, said scale-bar having a scale suitable to said last-named position for determining the amount of untyped margin at the trailing end of said work-sheet.

6. In a typewriting machine, the combination with a platen, a platen-carriage, and a cross-rod on said carriage in the rear of said platen, of a scale-bar having letter-space graduations arranged to be read when said bar is parallel to said platen and line-space graduations arranged to be read when said scale-bar is transversely disposed relatively to said platen for page-end-determining purposes, and means on said rod for disposing said scale-bar parallel to said platen, said means being further effective for disposing said scale-bar transversely to said platen at any desired point along the length of said platen.

7. In a typewriting machine, the combination with a platen, a platen-carriage, and a cross-rod on said carriage in the rear of said platen, of a scale-bar having letter-space graduations arranged to be read when said bar is parallel to said platen and line-space graduations arranged to be read when said scale-bar is transversely disposed relatively to said platen for page-end-determining purposes, and means on said rod for disposing said scale-bar parallel to said platen, said means being further effective for disposing said scale-bar transversely to said platen at any desired point along the length of said platen, said means including a carriage-device on said rod and movable laterally therealong, and a pivotal mounting on said carriage-device of said scale-bar.

8. In a typewriting machine, the combination with a platen, a platen-carriage, and a cross-rod on said carriage in the rear of said platen, of a scale-bar having letter-space graduations arranged to be read when said bar is parallel to said platen and line-space graduations arranged to be read when said scale-bar is transversely disposed relatively to said platen for page-end-determining purposes, and means on said rod for disposing said scale-bar parallel to said platen, said means being further effective for disposing said scale-bar transversely to said platen at any desired point along the length of said platen, said means including a carriage-device supported on said rod and movable therealong, a pivotal mounting for said scale-bar on said device whereby said scale-bar may be disposed parallel to said rod or transversely to said rod, and detent means effective for holding said scale-bar in either of its operative positions.

9. A scale-bar for a typewriting machine disposable in a horizontal and an upright work position and having letter-space graduations along one edge and figures associated therewith readable when the bar is substantially horizontal, said bar having line-space graduations along its other edge and figures associated therewith readable when said bar is disposed in a vertical plane.

10. A work-scale for a typewriting machine having letter-space graduations along one edge and line-space graduations along the other edge.

JESSE A. B. SMITH.